(12) United States Patent
Moles

(10) Patent No.: US 7,003,330 B2
(45) Date of Patent: Feb. 21, 2006

(54) WIRELESS MOBILE STATION WITH VISIBLE RF POWER DISABLE INDICATOR

(75) Inventor: Bryan Jeffery Moles, Dallas, TX (US)

(73) Assignee: Samsung Electronics Co., Ltd., (KR)

( * ) Notice: Subject to any disclaimer, the term of this patent is extended or adjusted under 35 U.S.C. 154(b) by 618 days.

(21) Appl. No.: 09/998,385

(22) Filed: Nov. 29, 2001

(65) Prior Publication Data

US 2003/0100352 A1    May 29, 2003

(51) Int. Cl.
 H04B 1/38   (2006.01)
 H04M 1/00   (2006.01)
(52) U.S. Cl. ............... 455/572; 455/573; 455/575.5; 455/575.6; 455/574
(58) Field of Classification Search ............. 455/566, 455/572, 573, 575.5, 575.6, 82, 83, 574
 See application file for complete search history.

(56) References Cited

U.S. PATENT DOCUMENTS 5,497,506 A * 3/1996 Takeyasu ............... 455/575.8
5,898,933 A * 4/1999 Kaschke ................. 455/575.7
5,983,119 A * 11/1999 Martin et al. ........... 455/575.7
5,987,311 A * 11/1999 Phillips .................. 455/575.7
6,246,891 B1 * 6/2001 Isberg et al. ............ 455/574
2002/0022504 A1 * 2/2002 Horii ...................... 455/575

FOREIGN PATENT DOCUMENTS

JP           63082104 A   *  4/1988

* cited by examiner

Primary Examiner—Rexford Barnie
Assistant Examiner—Tuan Pham

(57) ABSTRACT

A wireless mobile station comprising: 1) an RF transceiver that up-converts a baseband signal to produce an output RF signal; 2) an antenna coupled to the RF transceiver for transmitting the output RF signal; 3) a power supply that supplies power to the RF transceiver; and 4) switching circuitry associated with the antenna that provides a first conduction path between the power supply and the RF transceiver, such that when the antenna is in a first position, the first conduction path is closed and power is supplied to the RF transceiver from the power supply and when the antenna is translated to a second position, the first conduction path is opened and the power is not supplied to the RF transceiver from the power supply.

15 Claims, 2 Drawing Sheets

WIRELESS MOBILE STATION WITH VISIBLE RF POWER DISABLE INDICATOR

TECHNICAL FIELD OF THE INVENTION

The present invention is directed, in general, to wireless mobile devices and, more specifically, to an apparatus that visibly disables the RF transmitter circuitry of a wireless mobile device.

BACKGROUND OF THE INVENTION

There are several hundred million users of wireless mobile devices, including cellular telephones, in the world today. Competition, improved technology, and the building of a large wireless infrastructure have made wireless service widely available, while driving the price of wireless service down to the point where it is affordable to a large segment of the world population.

The previous generation of cellular phones were used primarily for voice conversations between a subscriber using a wireless mobile station (i.e., a cell phone) and another party. Increasingly, however, wireless mobile stations are data processing devices, such as personal digital assistant (PDA) systems equipped with cellular/wireless modems. These wireless PDA systems include a variety of handheld computers made by Palm, Inc., Compaq Corporation, Handspring, Inc., and others. The wireless PDA systems are used for web-browser applications, e-mail applications, remote network access, interactive games, and the like. More recently, wireless mobile stations have been introduced into the marketplace that are combination devices that operate both as a cell phone and as a data processing device.

The widespread use of wireless mobile devices has not been without its drawbacks, however. Many environments are not suitable for the use of wireless mobile stations. For example, there has been a great deal of concern that wireless mobile stations, primarily cell phones, may interfere with the avionic systems on aircraft. This has lead to a ban on the use of cell phones and other wireless mobile devices (e.g. Palm VII™) on aircraft. Cell phones also have been banned in movie theaters, symphony halls, hospitals, and similar places where the ringing of a cell phone may be a distraction or annoyance.

However, many wireless mobile stations also operate in a stand-alone mode in which an application that does not require a wireless capability may be executed. For example, a passenger on an airplane may wish to play a video game on a cell phone or may wish to view his or her appointment calendar when running a personal organizer application on a wireless PDA. The passenger cannot do this, however, if the use of cell phones or wireless PDA devices is prohibited on the plane. Many cell phones and other wireless PDA devices automatically try to establish radio frequency (RF) connections as soon as the devices are turned ON. This is true even if the users do not require RF connections. In attempting to access a local wireless network, these devices transmit RF signals, even if there is no wireless network in the area. In other wireless PDA devices, an RF connection is not automatically established when the device is turned ON, but only in response to a user command. However, there is no way for a flight crew member or a theater operator to simply glance at such a wireless PDA in order to determine that the PDA device is not transmitting or receiving RF signals. The end result is that a total ban on wireless mobile stations of all varieties is generally enforced, without regard to whether or not the wireless mobile stations are transmitting RF power.

Therefore, there is a need for a wireless mobile station in which RF power may be disabled in a highly visible and unambiguous manner so that applications that do not require an RF connection may be executed on the wireless mobile station.

SUMMARY OF THE INVENTION

To address the needs described above, it is a primary object of the present invention to provide a wireless mobile station in which the antenna may be physically translated or even removed in order to disable the power supplied to the internal RF transceiver. The removal of power from the RF transceiver thereby prevents the generation and transmission of any radio frequency (RF) signals.

According to a first advantageous embodiment of the present invention, the wireless mobile station comprises: 1) an RF transceiver capable of up-converting a baseband signal to produce an output RF signal; 2) an antenna coupled to the RF transceiver for transmitting the output RF signal; 3) a power supply capable of supplying power to the RF transceiver; and 4) switching circuitry associated with the antenna capable of providing a first conduction path between the power supply and the RF transceiver, such that when the antenna is in a first position, the first conduction path is closed and power is supplied to the RF transceiver from the power supply and when the antenna is translated to a second position, the first conduction path is opened and the power is not supplied to the RF transceiver from the power supply.

According to one embodiment of the present invention, translation of the antenna to the second position is highly visible to an observer.

According to another embodiment of the present invention, the switch circuitry provides a second conduction path between the power supply and an indicator lamp, such that when the antenna is in the first position, the second conduction path is closed and power is not supplied to the indicator lamp and when the antenna is translated to the second position, the second conduction path is opened and power is supplied to the indicator lamp, thereby illuminating the indicator lamp.

According to still another embodiment of the present invention, the indicator lamp produces a bright fluorescent light.

According to a second advantageous embodiment of the present invention, the wireless mobile station comprises: 1) an RF transceiver capable of up-converting a baseband signal to produce an output RF signal; 2) a removable antenna coupled to the RF transceiver for transmitting the output RF signal; 3) a power supply capable of supplying power to the RF transceiver; and 4) switching circuitry associated with the removable antenna for providing a first conduction path between the power supply and the RF transceiver, such that when the removable antenna is connected to the wireless mobile station, the first conduction path is closed and power is supplied to the RF transceiver from the power supply and when the antenna is disconnected from the wireless mobile station, the first conduction path is opened and the power is not supplied to the RF transceiver from the power supply.

According to yet another embodiment of the present invention, disconnection of the removable antenna from the wireless mobile station is highly visible to an observer.

In one embodiment of the present invention, the switch circuitry provides a second conduction path between the power supply and an indicator lamp, such that when the removable antenna is connected to the wireless mobile station, the second conduction path is closed and power is not supplied to the indicator lamp and when the removable antenna is not connected to the wireless mobile station, the second conduction path is opened and power is supplied to the indicator lamp, thereby illuminating the indicator lamp.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
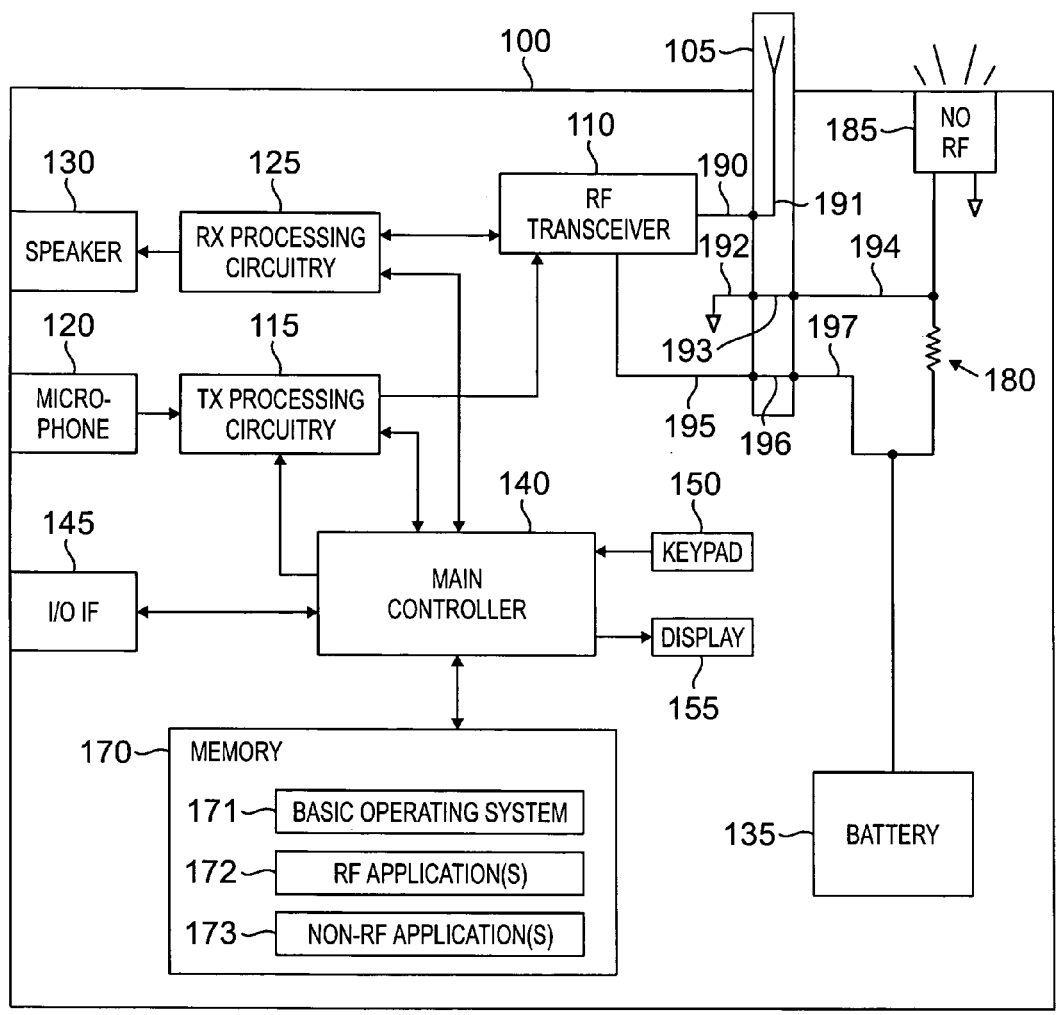
FIG. 1 illustrates an exemplary wireless mobile station embodying the principles of the present invention according to a first embodiment.
Figure 2:
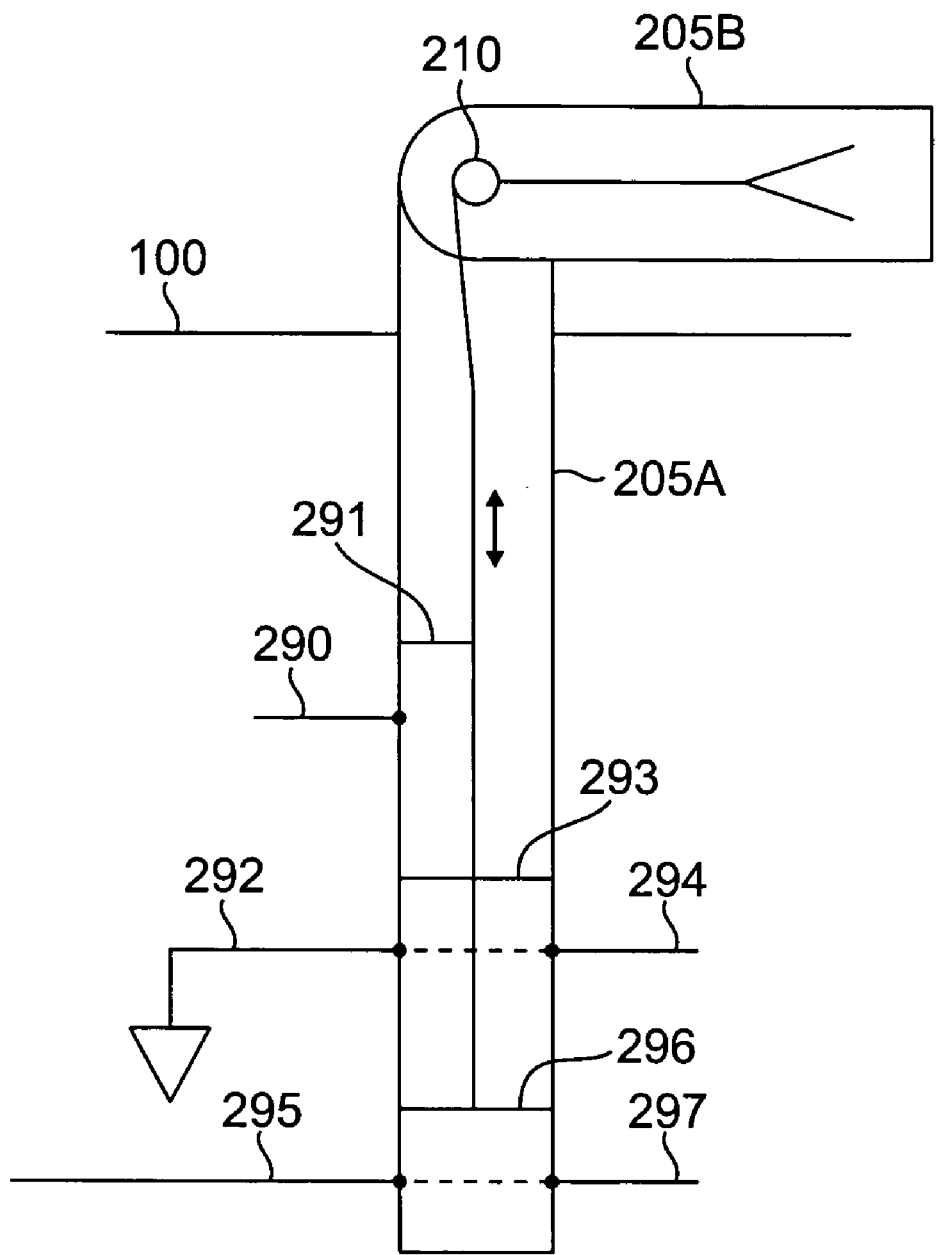
FIG. 2 illustrates selected portions of the exemplary wireless mobile station according to a second embodiment of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless mobile station.

FIG. 1 illustrates exemplary wireless mobile station 100 according to a first embodiment of the present invention. Wireless mobile station 100 comprises antenna 105, radio frequency (RF) transceiver 110, transmitter (TX) processing circuitry 115, microphone 120, receiver (RX) processor circuitry 125, speaker 130, battery 135, main controller 140, input/output (I/O) interface (IF) 145, keypad 150, display 155, resistor 180 and NO RF indicator lamp 185. Wireless mobile station 100 further comprises memory 170, which stores basic operating system (OS) program 171, one or more RF application program(s) 172, and one or more non-RF application programs 173. Wireless mobile station 100 may be a cell phone, a personal digital assistant (PDA) device equipped with a wireless modem, a two-way pager, a personal communication system (PCS) device, or any other conventional wireless mobile system.

Main controller 140 executes basic OS program 171 in order to control the overall operation of wireless mobile station 100. Main controller 140 controls the reception of forward channel signals and the transmission of reverse channel signals by RF transceiver 110 in accordance with well-known principles. Main controller 140 is also coupled to I/O interface 145, keypad 150 and display unit 155. Main controller 140 controls the transmission of signals to and from these elements with methods well known in the art.

RF transceiver 110 receives from antenna 105 an incoming RF signal transmitted by a base station of a wireless communication network, such as a cellular phone network. RF transceiver 110 down-converts the incoming RF signal to produce an intermediate frequency (IF) or a baseband signal. The IF or baseband signal is sent to RX processing circuitry 125 which produces a processed baseband signal by filtering, decoding, and/or digitizing the baseband or IF signal to produce a processed baseband. RX processing circuitry 125 transmits the processed baseband signal to speaker 130 (i.e., voice data) or to main controller 140 for further processing (i.e., web data, interactive video game data).

TX processing circuitry 115 receives analog or digital voice data from microphone 120 or other outgoing baseband data (i.e., web data, e-mail interactive video game data) from main controller 140 baseband and encodes, multiplexes, and/or digitizes the outgoing baseband data to produce a processed baseband or IF signal. RF transceiver 110 receives the outgoing processed baseband or IF signal from TX processing circuitry 115 and up-converts it to an RF signal that is transmitted via antenna 105.

As the contents of memory 170 indicate, exemplary wireless mobile station 100 is capable of executing both RF applications 172 and non-RF applications 173. RF applications 172 may include a wireless web browsing application, an interactive video game application, a cellular telephone control program, transmitting or receiving e-mail, and the like. Non-RF applications 173 may include a non-interactive video game, such as solitaire, a calendar application, a spread sheet application, viewing old e-mail stored in an In Box, and the like. According to the principles of the present invention, when exemplary wireless mobile station 100 is being used in an airplane or other environment in which the transmission of RF signals is prohibited, wireless mobile station 100 is capable of executing non-RF applications 173 while indicating to observers (e.g., flight crew) in a highly visible manner that no RF signals are being transmitted. According to an advantageous embodiment of the present invention, antenna 105 may be removed from exemplary wireless mobile station 100 and, when removed, disables the power supplied to RF transceiver 110. The removal of power from RF transceiver 110 thereby prevents the generation and transmission of any radio frequency (RF) signals.

Antenna 105 comprises conductor 191, which transmits and receives RF signals when antenna 105 is inserted into wireless mobile station 100. Antenna 105 also comprises conductor 193 and conductor 196. When antenna 105 is properly inserted in wireless mobile station 100, conductor 191 is connected to conductor 190, which is the output line for RF transceiver 110. Also, when antenna 105 is properly inserted, conductor 193 is connected to conductors 192 and 194, and conductor 196 is connected to conductors 195 and 197.

Thus, with antenna 105 properly inserted, conductors 195, 196 and 197 connect RF transceiver 110 directly to battery 135, thereby providing power to RF transceiver 110 and permitting wireless mobile station 100 to transmit RF signals. Also, with antenna 105 properly inserted, conductors 192, 193, and 194 connect both terminals of NO RF indicator lamp 185 to ground. With both terminals grounded, no current flows in NO RF indicator lamp 185, preventing it from lighting. Resistor 180 protects battery 135 from shorting to ground.

However, if antenna 105 is removed, conductor 196 is removed and open-circuits the connection between conductors 195 and 197. This disconnects RF transceiver 110 from battery 135, thereby disabling power to RF transceiver 110 and preventing wireless mobile station 100 from transmitting RF signals. Also, with antenna 105 removed, conductor 193 is removed and open-circuits the connection between conductors 192 and 194. This allows current to flow from battery 135 through resistor 180 and through NO RF indicator lamp 185 to ground. The current flow in NO RF indicator lamp 185 causes NO RF indicator lamp 185 to light.

According to an exemplary embodiment of the present invention, NO RF indicator lamp 185 is a highly visible colored lamp, such as a bright fluorescent orange, yellow or lime green color, with the legend "NO RF" printed thereon in black lettering. Thus, wireless mobile station 100 provides two highly visible indicators to passersby that wireless mobile station 100 is not transmitting RF signals. First, the absence of antenna 105 indicates that RF signals have been disabled. Second, the bright glow of NO RF indicator lamp 185 also indicates that RF signals have been disabled. Thus, after removing antenna 105, the operator can use wireless mobile station 100 to perform non-RF application(s) 173.

FIG. 2 illustrates selected portions of exemplary wireless mobile station 100 according to a second embodiment of the present invention. It is not strictly necessary that antenna 105 in FIG. 1 be removed from wireless mobile station 100 in order to provide a highly visible indicator that RF power has been disabled.

In alternate embodiments of the present invention, antenna 105 may be used to open-circuit conductors 193 and 196 by being rotated 90 degrees about the vertical axis, by being partially withdrawn from wireless mobile station 100, by being depressed into wireless mobile station 100, or by being translated from a first position to a second position in some other manner.

In the example illustrated in FIG. 2, antenna 205 comprises a lower antenna portion 205A and an upper antenna portion 205B. Lower antenna portion 205A and upper antenna portion 205B are rotatably coupled at pivot 210. Conductor 291 in antenna 205 is connected to pivot 210, which acts like a pulley as upper antenna portion 205B is rotated between a vertical position and a horizontal position. Rotating upper antenna portion 205B raises and lowers conductors 291, 293 and 296, as indicated by the directional arrows.

Thus, conductor 291 is connected to conductor 290 (and RF transceiver 110) when antenna portion 205B is in the vertical position. When antenna portion 205B is in the vertical position, conductor 293 connects conductors 292 and 294, similar to conductors 192, 193 and 194 in FIG. 1. When antenna portion 205B is in the vertical position, conductor 296 connects conductors 295 and 297, also similar to conductors 195, 196 and 197 in FIG. 1. Thus, rotating antenna portion 205B has the same effect of enabling and disabling RF power and switching NO RF indicator lamp 185 ON and OFF as the removal and insertion of antenna 105 in FIG. 1.

Again, wireless mobile station 100 provides two highly visible indicators to passersby that wireless mobile station 100 is not transmitting RF signals. First, the horizontal rotation of upper antenna portion 205B indicates that RF signals have been disabled. Second, the bright glow of NO RF indicator lamp 185 also indicates that RF signals have been disabled.

Although the present invention has been described in detail, those skilled in the art should understand that they can make various changes, substitutions and alterations herein without departing from the spirit and scope of the invention in its broadest form.

What is claimed is:

1. A wireless mobile station comprising:
   an RF transceiver capable of up-converting a baseband signal to produce an output RF signal;
   an antenna coupled to said RF transceiver for transmitting said output RF signal;
   a power supply capable of supplying power to said RF transceiver; and
   wherein said antenna comprises
   a first conductor capable of providing a first conduction path between said power supply and said RF transceiver, such that when said antenna is in a first position, said first conduction path is closed and power is supplied to said RF transceiver from said power supply and when said antenna is translated to a second position, said first conduction path is opened and said power is not supplied to said RF transceiver from said power supply, and
   a second conductor capable of providing a second conduction path between said power supply and an indicator lamp, such that when said antenna is in said first position, said second conduction path is closed and power is not supplied to said indicator lamp and when said antenna is translated to said second position, said second conduction path is opened and power is supplied to said indicator lamp, thereby illuminating said indicator lamp.

2. The wireless mobile station as set forth in claim 1 wherein translation of said antenna to said second position is highly visible to an observer.

3. The wireless mobile station as set forth in claim 1 wherein said indicator lamp produces a bright fluorescent light.

4. The wireless mobile station as set forth in claim 1 wherein the wireless mobile station is a cellular telephone handset.

5. The wireless mobile station as set forth in claim 1 wherein the wireless mobile station is a personal digital assistant (PDA) device equipped with a wireless modem.

6. A wireless mobile station comprising:
an RF transceiver capable of up-converting a baseband signal to produce an output RF signal;
a removable antenna coupled to said RF transceiver for transmitting said output RF signal;
a power supply capable of supplying power to said RF transceiver; and
wherein said removable antenna comprises
a first conductor capable of providing a first conduction path between said power supply and said RF transceiver, such that when said removable antenna is connected to said wireless mobile station, said first conduction path is closed and power is supplied to said RF transceiver from said power supply and when said antenna is disconnected from said wireless mobile station, said first conduction path is opened and said power is not supplied to said RF transceiver from said power supply, and
a second conductor capable of providing a second conduction path between said power supply and an indicator lamp, such that when said removable antenna is connected to said wireless mobile station, said second conduction path is closed and power is not supplied to said indicator lamp and when said removable antenna is not connected to said wireless mobile station, said second conduction path is opened and power is supplied to said indicator lamp, thereby illuminating said indicator lamp.

7. The wireless mobile station as set forth in claim 6 wherein disconnection of said removable antenna from said wireless mobile station is highly visible to an observer.

8. The wireless mobile station as set forth in claim 6 wherein said indicator lamp produces a bright fluorescent light.

9. The wireless mobile station as set forth in claim 6 wherein the wireless mobile station is a cellular telephone handset.

10. The wireless mobile station as set forth in claim 6 wherein the wireless mobile station is a personal digital assistant (PDA) device equipped with a wireless modem.

11. For use in a wireless mobile station comprising an RF transceiver capable of up-converting a baseband signal to produce an output RF signal, an indicator lamp, an antenna coupled to the RF transceiver for transmitting the output RF signal, the antenna comprising a first conductor and a second conductor, and a power supply capable of supplying power to the RF transceiver, a method of supplying power to the RF transmitter comprising the steps of:
positioning the antenna in a first position wherein the first conductor closes a first conduction path between the power supply and the RF transceiver, such that power is supplied to the RF transceiver from the power supply, and wherein the second conductor closes a second conduction path between the power supply and the indicator lamp, such that power is not supplied to the indicator lamp; and
positioning the antenna in a second position wherein the first conductor opens the first conduction path between the power supply and the RF transceiver, such that power is not supplied to the RF transceiver from the power supply, and wherein the second conductor opens the second conduction path, such that power is supplied to the indicator lamp, thereby illuminating the indicator lamp.

12. The method of claim 11, wherein the second position of the antenna is visibly different to an observer from the first position of the antenna.

13. The method of claim 11, wherein the indicator lamp produces a bright fluorescent light.

14. The method of claim 11, wherein the wireless mobile station is a cellular telephone handset.

15. The method of claim 11, wherein the wireless mobile station is a personal digital assistant (PDA) device equipped with a wireless modem.

* * * * *